3,316,237
ADDITIVE FOR CUTTING-OILS AND FOR HIGH-PRESSURE OILS
Luigi Imparato and Sergio Del Ross, Milan, Italy, assignors to SNAM S.p.A., Milan, Italy, an Italian company
No Drawing. Filed Jan. 17, 1964, Ser. No. 338,325
Claims priority, application Italy, Jan. 21, 1963, 1,245/63, Patent 681,902
5 Claims. (Cl. 260—139)

It is an object of the present invention to provide an additive for cutting-oils and to provide high-pressure oils and compositions containing said additive.

It is known to employ additives for lubricating oils of the kind indicated above which contain in various ways chemically active constituents such as sulfur, chlorine and phosphorus. In order of time the first additives used in this field were those based on sulfur. The sulfur may be chemically bonded or partly dissolved in substances such as aromatic extracts, oils of mineral origin, animal origin or vegetable origin. The process for obtaining that kind of additive is very simple and consists in heating, in suitable conditions and ratios, the mixture to be treated with sulfur. The products so obtained, though possessing good technological qualities, often present considerable inconveniences both as regards storing and employment: in fact they are dark, of disagreeable odour, they are generally corrosive also at room temperature and they cause within short time sensible turbidity and deposits. In order to avoid these disadvantages, the methods of preparation were improved and in particular the attempt was made at introducing the sulfur in organic molecules through definite chemical reaction so as to obtain products better suited for the purpose.

Other additives employed in cutting oils and in high-pressure oils are those based on chlorine.

These additives do not present the inconveniences met with those based on sulfur and in particular they have no corrosive action upon materials of copper or of copper alloys, they impart to the lubricants good qualities of resistance against loads but lower than those of additives based on sulfur.

Many among the best additives for high-pressure oils contain contemporaneously sulfur and chlorine in order to exploit the properties of both elements.

One of the techniques most followed to prepare additives of the kind described based on chlorine or sulfur, consists in treating unsaturated substances of organic character with sulfur monochloride and/or dichloride. The substances utilizable to produce these additives by means of the addition of chlorine and sulfur are of various kinds. Much used are those of animal and vegetable origin such as fatty acids and esters of fatty acids, unsaturated such as oleic acid, talloil and the like, sperm oil, whale oil, various terpenes such as pinene, terpineol and determined petroleum fractions.

Hence there are many substances made to react with sulfur chloride to obtain additives for lubricants with antiwelding and antiwear characteristics.

Many of those additives, though having good technological properties, are not free from considerable inconveniences such as turbidity and the subsequent formation of deposits in the oil to which they are added, corrosivity in the cold and strong acidity.

It has been found that the presence of sulfur and chlorine in an organic molecule is not sufficient alone to impart thereto characteristics suited for use as an additive for high-pressure oils.

As the case may be, balancing of the various factors to attain determined objects, for instance, the concentration of the active element in the additive, the polarity thereof, its solubility, its stability in time, its reactivity, more or less ready, is achieved by a suitable choice and dosage of the reactant substances as well as of the reaction conditions.

One of the objects of the present invention is the preparation of an additive, for cutting-oils and for high pressure oils, based on chlorine and sulfur, which is easily soluble in the oils and imparts to them considerable antiwelding properties.

Another object is to obtain with our additive clear oils stable in time, namely free from turbidity and deposit formation.

A more specific object is to obtain an additive with elongated content of chlorine and sulfur, which is strongly polar, with which it is possible to prepare cutting-oils and high pressure oils extremely resistant to heavy loads and heavy cutting speeds, and chemically inactive also towards copper or towards copper alloys at room temperature.

We have found that the aforesaid objects are advantageously attained with a product obtained by treating with sulfur monochloride and/or sulfur dichloride unsaturated substances having a straight or branched or cyclic chain, having one or more double bonds, in the presence of an epoxide, such as for instance propylene oxide.

Among the unsaturated substances are preferably used amylene, dodecylene, cyclohexene, cyclopentene, pentadiene, low-molecular weight polymeric olefins, styrene, styrene-substituted compounds, oleic acid, linoleic acid, pine oil, terpenes, glycerides and methyl and ethyl esters of the aforementioned unsaturated fatty acids and mixtures of the various substances cited above. The unsaturated compounds are reacted in the presence of an epoxide with proportions of sulfur chloride variable according to the kind or the mixture of olefins treated and of the reacting conditions, from a minimum of 5% up to a maximum of 60% by weight. Generally, the quantity of sulfur chloride employed increases with the increase of the iodine number of the olefin or of the mixture of unsaturated compounds made to react.

The epoxidic substance employed varies from 10 to 50% by weight in function of the molecular weight of the very substance and of the reaction conditions; among the preferable epoxidic substances there are propylene oxide, amylene oxide, styrene oxide, unsaturated epoxidized vegetable or animal oils and epichlorohydrin.

The presence of these epoxidic substances modifies the course of the sulfochlorinating reaction with respect to the conventional processes, thereby obtaining lower chlorine losses, lower development of corrosive vapours and a product smelling agreeably, of clear appearance and greater stability during storage even under the action of light and of air.

The product obtained contains compounds having high concentration of active chlorine and sulfur, strongly polar and very effective under severe conditions of employment. It is utilized by adding thereto mineral oils in amounts of from 0.1 to 30% by weight and preferably of from 1 to 10% by weight.

According to the present invention the reaction temperature, keeping in account also the boiling point of the sulfochlorinated mixture, is from 30 to 100° C.; generally however it is preferred to keep the temperature at from 50 to 60° C. if this is permitted by the kind of compounds present.

In an analogous manner, with direct dependency on the temperature and on the amount of sulfur chloride added, the duration of the reaction is from 10 minutes to 3 hours.

The succession of the mixing and sulfochlorinating operations may vary, and for every type of composition is determined by considerations of practice.

In some cases, to render the product more fluid or to eliminate its corrosive tendency in cold against copper and its alloys by means of neutralization with alkaline solutions, it is convenient to carry out the sulfochlorination in the presence of a solvent selected among the compounds having low boiling point, of aromatic character, such as for instance benzene; the ratios by volume between the reactant and the solvent are in the preferred embodiment close to 1/1.

The use of catalysts of the type of iron chlorides, aluminium chlorides and zinc chlorides or the presence of metallic traces may be convenient to increase the speed of reaction also if they displace the sulfur to chlorine ratio in the finished product towards sulfur.

The product prepared according to the present invention, dissolved in lubricating oil, is active beyond 50° C. with respect to copper and its alloys and is highly indicated for the working of very hard materials such as for instance stainless steel.

To reduce the activity of the product, if no neutralization is carried out, it is kept at temperatures of 40 to 100° C. for some hours, then dry air is insufflated and the product is ready for use, after having removed by distillation any solvent employed.

In order to make clear the advantages attainable by the process and by the compositions of the instant invention we shall hereinafter report some examples of preparation of compositions which will be compared with analogous products prepared in the absence of epoxides.

*Example 1*

A mixture consisting of 162 g. of bidistilled olein and 64 g. of n-heptane is sulfochlorinated by adding slowly 38 g. of sulfur monochloride, keeping the reaction temperature at 60–65° C.; there occurs at once development of acid vapours.

On termination of the reaction, the solvent is evaporated in vacuo. The product obtained (Sample A) is very dark (8 A.S.T.M.–D1500), very viscous ($VE_{50}=109$), has a neutralization number of 153.5 mg. of KOH/g., a sulfur content of 9.63% and a chlorine content of 9.14%. The product evolves acid vapours after few hours from preparation.

*Example 2*

A mixture consisting of 162 g. of bidistilled olein and 53 g. of alpha-epichlorohydrin is sulfochlorinated with 36 g. of sulfur monochloride, keeping the temperature at 70° C. The product obtained (Sample B) is clear red (6–7 A.S.T.M.–D1500) and fluid ($VE_{50}=22.11$), has a neutralization number of 141.3 mg. of KOH/g., a sulfur content of 8.58% and a chlorine content of 11.19%.

The product has not developed any acid vapours either during preparation or in the subsequent 3 months.

*Example 3*

A mixture consisting of 162 g. of bidistilled olein and of 36 g. of butylene oxide is sulfochlorinated by slowly adding 32 g. of sulfur monochloride under strong stirring while keeping the temperature at 60–65° C. On termination of the reaction, the temperature was kept at 60° C. for about 40 minutes. The product obtained (Sample C) is clear and of clear colour (4 A.S.T.M.–D1500), very fluid ($VE_{50}=9.08$); it has a neutralization number of 117.5 mg. of KOH/g., a sulfur content of 8.60% and a chlorine content of 7.94%.

The product did not develop any acid vapours either during preparation or during the subsequent 3 months.

*Example 4*

120 g. of technical styrene were treated with 80 g. of sulfur monochloride under vigorous stirring at a temperature of 70° C. There occurs a weak development of hydrochloric acid. On termination of the sulfochlorination the mixture continues to be stirred while keeping the temperature at about 60° C. and in sufflating dry air for about 45 minutes to remove the traces of sulfur monochloride within the mass.

The product obtained (Sample D) is limpid yellow (3 A.S.T.M.–D1500), very fluid ($VE_{50}=7.28$); it has a neutralization number of 11.5 mg. of KOH/g., a sulfur content of 19.58% and a chlorine content of 19.55%. A few hours after preparation acid vapours develop and after 30 days the sample, kept at room temperature and under light, is turbid and leaves deposits.

*Example 5*

A mixture consisting of 120 g. of technical styrene and of 100 g. of benzene is treated with 80 g. of sulfur monochloride keeping the temperature at 60–70° C.

On termination of the reaction the mass was heated to 70° C. for one hour and then the solvent was distilled in vacuo. The product obtained (Sample E) is of limpid yellow colour (3 A.T.S.M.–D1500), of sharp odour, very fluid ($VE_{50}=5.9$), it has a neutralization number of 19.3 mg. of KOH/g., a sulfur content of 19.10% and a chlorine content of 19.98%.

The product left at room temperature darkens and after one month it is turbid.

*Example 6*

A mixture consisting of 120 g. of a technical styrene and of 50 g. of propylene oxide is treated slowly with 80 g. of sulfur monochloride. The reaction mixture is stirred strongly and the temperature is kept at 60° C. On termination of the reaction one continues stirring and temperature is raised to 70° C. for one hour. The product obtained (Sample F) is of straw-yellow colour free from fumes and from acid vapours. After ten months' storage the product has no disagreeable odours, it has a limpid clear colour (2.3 A.S.T.M.–D1500), it is very fluid ($VE_{50}=7.28$), the neutralization number is 4.3 mg. of KOH/g., the sulfur content is of 18.85%, and it does not develop any vapours, and it forms no deposits.

*Example 7*

A mixture consisting of 40 g. of bidistilled olein and of 90 g. of technical styrene is treated with 70 g. of sulfur monochloride added slowly, keeping the temperature between 65 and 70° C. There occurs a development of acid vapours during the reaction. The product obtained (Sample G) has lightly sharp odour and very dark colour (8 A.S.T.M.–D1500), it is fairly fluid ($VE_{50}=13.30$), it has a neutralization number of 42.5 mg. of KOH/g., a sulfur content of 16.30% and a chlorine content of 16.96%.

*Example 8*

A mixture consisting of 60 g. of bidistilled olein, of 150 g. of technical styrene and of 75 g. of propylene oxide is treated with 105 g. of sulfur monochloride added slowly under vigorous stirring at a temperature of 65° C. During the reaction and in the first 8 months of preservation there occurred no deposits or acid vapours. The product (Sample H), after 8 months' time, is limpid and of slightly dark colour (5 A.S.T.M.–D1500), very fluid ($VE_{50}=5.44$) and has a neutralization number of 0.04 mg. of KOH/g., a sulfur content of 14.88% and a chlorine content of 13.94%.

*Example 9*

A mixture consisting of 40 g. of bidistilled olein, of 90 g. of technical styrene and of 26 g. of alpha-epichlorohydrin, is treated by adding slowly 70 g. of sulfur monochloride keeping under vigorous stirring at 55° C. There does not occur any development of acid vapours either during the reaction or subsequently. The final product (Sample I) has a red-dish colour (6 A.S.T.M.–D1500), is very fluid ($VE_{50}=8.97$), has a neutralization number of 20.2 mg. of KOH/g. and has a sulfur content and chlorine content of 13.68% and 19.67% respectively.

Example 10

A mixture consisting of 40 g. of bidistilled olein, 90 g. of technical styrene, 13 g. of alpha-epichlorohydrin and 8.2 g. of propylene oxide is treated with 70 g. of sulfur monochloride added slowly, under vigorous stirring at a temperature of 50° C. There occurs no development of any acid vapours. The product obtained has clear and limpid colour (4.5 A.S.T.M.–D1500), is very fluid ($VE_{50}$=9.91), has a neutralization number of 19.6 mg. of KOH/g., a sulfur content of 14.65% and a chlorine content of 17.50%. One month after preparation there does not develop any acid vapours.

The samples obtained in the hereinbefore described examples were subjected to the physical and technological tests indicated in Tables I and II.

The basic oil employed for the technological tests has the following characteristics:

$D_{15}$=0.912
$VE_{50}$=2.32
I.V.=33
Welding load
With the 4 balls machine E.P.=140 kg.
Neutralization number=0.02 mg. of KOH/g.

TABLE I

| | Appearance after 24 hours from preparation | ASTM Colour–D1500 | $VE_{50}$ | Neutralization No. NOM-M-79-91, mg. KOH/g. | S, Percent | Cl, Percent | S/Cl |
|---|---|---|---|---|---|---|---|
| Sample A | Limpid | 8 | 109 | 153.5 | 9.63 | 9.14 | 1.053 |
| Sample B | do | 6–7 | 22.11 | 141.3 | 8.58 | 11.19 | 0.766 |
| Sample C | do | 4 | 9.08 | 117.5 | 8.60 | 7.94 | 1.083 |
| Sample D | do | 3 | 7.28 | 11.5 | 19.58 | 19.55 | 1.001 |
| Sample E | do | 3 | 19.3 | 19.3 | 19.10 | 19.98 | 0.955 |
| Sample F | do | 2 | 4.3 | 4.3 | 17.70 | 18.85 | 0.938 |
| Sample G | do | 8 | 13.30 | 42.5 | 16.30 | 16.96 | 0.961 |
| Sample H | do | 4 | 5.44 | 0.04 | 14.88 | 13.94 | 1.067 |
| Sample I | do | 6 | 8.97 | 20.2 | 13.68 | 19.67 | 0.695 |
| Sample L | do | 4.5 | 9.91 | 19.6 | 14.65 | 17.50 | 0.837 |

TABLE II.—ADDITION TO OIL

| | At 2% | | | | At 5% | | |
|---|---|---|---|---|---|---|---|
| | Appearance | Corrosion on copper at 100° C. | | | Appearance | Welding load with the 4 balls machine E.P.,[2] Kg. | Wearing diameter at 350 kg. with the 4 balls machine E.P.,[2] mm. |
| | | Plate[1] after 1 h. | Plate[1] after 2 h. | Plate[1] after 3 h. IP. 64-53 | | | |
| Sample A | Limpid | 1b | 1b | 1b–2a | Limpid | 420 | 2.10 |
| Sample B | do | 1a–1b | 2a–2b | 2c | do | 460 | 1.70 |
| Sample C | do | 1b | 1b | 1b–2a | do | 420 | 2.25 |
| Sample D | do | 3b | 3b | 3b | do | 600 | 1.50 |
| Sample E | do | 3b | 3b | 3b | It does not dissolve | | |
| Sample F | do | 3a | 3b | 3b | Limpid | 620 | 1.68 |
| Sample G | do | 3b | 3b–4a | 4a | do | 600 | 1.55 |
| Sample H | do | 2d | 3b | 3b | do | 610 | 1.65 |
| Sample I | do | 2a–2b | 2b–2c | 3b | do | 600 | 1.70 |
| Sample L | do | 1a–1b | 2b | 3b | do | 620 | 1.85 |

[1] The classification of the plates was made according to A.S.T.M.–D130.
[2] 60 seconds test at the speed of 1,500 revolutions per minute.

We claim:

1. An additive for mineral and synthetic lubricating oils, capable of imparting to them antiwelding and antiwearing properties, comprising the product formed by reacting an unsaturated hydrocarbon compound with a sulfur chloride in the presence of an epoxy compound, at temperatures of from 30° C. to 100° C., the quantities of the sulfur chloride and of the epoxy compound employed varying from 5% to 60% by weight and from 10% to 50% by weight, respectively, with relation to the total amount of the reagents.

2. An additive as claimed in claim 1, wherein the unsaturated hydrocarbon compound is an olefin having from 5 to 18 carbon atoms.

3. An additive as claimed in claim 2, wherein the epoxy compound has from 13 to 18 carbon atoms.

4. An additive for mineral and synthetic lubricating oils, capable of imparting to them antiwelding and antiwearing properties, comprising the product formed by reacting an unsaturated compound selected from the group consisting of amylene, dodecylene, cyclohexene, cyclopentene, pentadiene, low molecular weight olefinic polymers, styrene, styrene-substituted compounds, oleic acid, linoleic acid, pine oil, terpenes, glycerides, and methyl and ethyl esters of the named acids with a sulfur chloride in the presence of an epoxy compound, at temperatures of from 30° C. to 100° C., the quantities of the sulfur chloride and of the epoxy compound employed varying from 5% to 60% by weight and from 10% to 50% by weight, respectively, with relation to the total amount of the reagents.

5. An additive as claimed in claim 4, wherein the epoxy compound is selected from the group consisting of propylene oxide, butylene oxide, amylene oxide, styrene oxide, epoxidized vegetable and animal oils, and epichlorohydrins.

References Cited by the Examiner

UNITED STATES PATENTS

| | | | |
|---|---|---|---|
| 2,227,952 | 1/1941 | Zimmer | 252—48.4 |
| 2,244,886 | 6/1941 | Lincoln et al. | 252—48.8 |
| 2,433,853 | 1/1948 | Lincoln et al. | 252—48.4 |
| 2,496,508 | 2/1950 | Watson et al. | 260—139 |
| 2,539,188 | 1/1951 | Gamson et al. | 260—1.39 |
| 2,675,373 | 4/1954 | Brooks et al. | 260—139 |
| 2,943,990 | 7/1960 | Rausch et al. | 260—139 |
| 3,210,280 | 10/1965 | Rich | 260—139 |

DANIEL E. WYMAN, *Primary Examiner.*

L. G. XIARHOS, *Assistant Examiner.*